United States Patent
Zhang et al.

(10) Patent No.: US 12,001,466 B2
(45) Date of Patent: Jun. 4, 2024

(54) KNOWLEDGE GRAPH-BASED CASE RETRIEVAL METHOD, DEVICE AND EQUIPMENT, AND STORAGE MEDIUM

(71) Applicant: PING AN TECHNOLOGY (SHENZHEN) CO., LTD., Guangdong (CN)

(72) Inventors: Xuechen Zhang, Guangdong (CN); Jiawei Liu, Guangdong (CN); Xiuming Yu, Guangdong (CN); Chen Chen, Guangdong (CN); Ke Li, Guangdong (CN); Wei Wang, Guangdong (CN)

( * ) Notice: Subject to any disclaimer, the term of this patent is extended or adjusted under 35 U.S.C. 154(b) by 563 days.

(21) Appl. No.: 17/271,209

(22) PCT Filed: May 29, 2020

(86) PCT No.: PCT/CN2020/093421
§ 371 (c)(1),
(2) Date: Feb. 25, 2021

(87) PCT Pub. No.: WO2021/139074
PCT Pub. Date: Jul. 15, 2021

(65) Prior Publication Data
US 2022/0121695 A1 Apr. 21, 2022

(30) Foreign Application Priority Data
Jan. 8, 2020 (CN) .......................... 202010017590.4

(51) Int. Cl.
*G06F 16/33* (2019.01)
*G06F 40/40* (2020.01)
*G06N 5/02* (2023.01)

(52) U.S. Cl.
CPC .......... *G06F 16/3347* (2019.01); *G06F 40/40* (2020.01); *G06N 5/02* (2013.01)

(58) Field of Classification Search
USPC .............................................. 704/7–10, 257
See application file for complete search history.

(56) References Cited

U.S. PATENT DOCUMENTS

| 11,687,823 | B2 * | 6/2023 | Yoshikawa | G06N 7/01 706/12 |
| 2015/0269691 | A1 * | 9/2015 | Bar Yacov | G06F 16/334 705/311 |
| 2017/0132730 | A1 * | 5/2017 | Takuma | G06F 16/26 |
| 2018/0144421 | A1 * | 5/2018 | Williams | G06Q 50/18 |

* cited by examiner

*Primary Examiner* — Leonard Saint-Cyr

(57) ABSTRACT

This application discloses a knowledge graph-based case retrieval method, device and equipment, and a storage medium. The method includes: constructing a legal case knowledge graph based on text information; performing random-walk sampling on node set data constructed based on the legal case knowledge graph, so as to obtain a plurality of pieces of sequence data; training a model by using a word2vec algorithm based on the plurality of pieces of sequence data, so as to obtain an updated target model; obtaining target text information, and analyzing the target text information by using the target model, so as to construct a to-be-retrieved knowledge graph; retrieving the legal case knowledge graph based on the to-be-retrieved knowledge graph, so as to obtain case information associated with the to-be-retrieved knowledge graph; and obtaining outputted case information based on a first similarity and a second similarity of the case information.

16 Claims, 6 Drawing Sheets

KNOWLEDGE GRAPH-BASED CASE RETRIEVAL METHOD, DEVICE AND EQUIPMENT, AND STORAGE MEDIUM

This application claims priority to Chinese Patent Application No. 202010017590.4, filed with the China National Intellectual Property Administration on Jan. 8, 2020 and entitled "KNOWLEDGE GRAPH-BASED CASE RETRIEVAL METHOD, DEVICE AND EQUIPMENT, AND STORAGE MEDIUM", which is incorporated herein by reference in its entirety.

TECHNICAL FIELD

This application relates to the field of knowledge graphs in the field of big data, and in particular, to a knowledge graph-based case retrieval method, device and equipment, and a storage medium.

BACKGROUND

A similar-case search method is to retrieve past cases based on relevant information of a case to find the most similar case. The obtained case information can provide references for judges or related personnel in litigation cases. The current similar-case search method is to retrieve the full text of judgment documents based only on relevant fields in the judgment documents, and does not deal with a clear correspondence between the judgment documents and "key facts" of the judicial judgment. It is difficult to use keywords to describe logic and factors affecting inconsistent expression of relevant information such as a dispute focus, a cause, and a claim in different documents, so that retrieval is inaccurate and unprofessional.

In current similar-case retrieval, query content input by a user is received, and the query content is analyzed to obtain first key information of the query content; second key information is obtained from a created judge knowledge graph based on the first key information, and a database is retrieved based on the second key information, so as to obtain case text associated with the second key information; and the case text is sorted, and the sorted case text is recommended and output based on a predetermined recommendation condition. The inventor realizes that because the judge knowledge graph is only a knowledge graph constructed based on the content of the judgment documents, the reference object for retrieval is relatively single, and the obtained case text is not very useful as a reference; consequently, the number of retrievals and retrieval methods increase, and availability of the case retrieval system is low.

Technical Problems

This application provides a knowledge graph-based case retrieval method, device and equipment, and a storage medium, which are used for steps such as constructing a legal case knowledge graph, retrieving the legal case knowledge graph, random-walk sampling, and cosine similarity calculation, so that case information of the legal case knowledge graph and a to-be-retrieved knowledge graph is more relevant, professional, and comprehensive in description, and the system is highly extensible and operable, so that the retrieval speed and accuracy are improved, and the number of user operations on the system is reduced to improve availability of the case retrieval system.

Technical Solutions

A first aspect of embodiments of this application provides a knowledge graph-based case retrieval method, including:

constructing a legal case knowledge graph by analyzing text information based on a predetermined model, and constructing node set data by analyzing the legal case knowledge graph, where the text information includes historical and/or real-time claim information of a plaintiff, defense information of a defendant, evidence information provided by the plaintiff, evidence information provided by the defendant, and historical legal case information;

performing random-walk sampling on the node set data by using each node of the node set data as a starting point, so as to obtain a plurality of pieces of sequence data;

training the model by using a word2vec algorithm based on the plurality of pieces of sequence data, so as to obtain an updated target model;

obtaining target text information, and analyzing the target text information by using the target model, so as to construct a to-be-retrieved knowledge graph;

retrieving case information and first word embedding vector data associated with the to-be-retrieved knowledge graph from the legal case knowledge graph, and obtaining second word embedding vector data of the to-be-retrieved knowledge graph;

calculating a first similarity and a second similarity of the case information based on the first word embedding vector data and the second word embedding vector data, and adding the first similarity and the second similarity to obtain a target similarity, where the first similarity indicates a similarity of the case information in a content description, and the second similarity indicates a similarity of the case information in a logical relationship; and sorting the case information in descending order of values of the target similarity, and outputting the sorted case information.

A second aspect of the embodiments of this application provides a knowledge graph-based case retrieval device, where the retrieval device has a function of implementing the knowledge graph-based case retrieval method according to the first aspect. The function may be implemented by hardware, or may be implemented by executing corresponding software by hardware. The hardware or software includes one or more modules corresponding to the foregoing functions, and units may be software and/or hardware.

The device includes:

a first construction unit, configured to construct a legal case knowledge graph by analyzing text information based on a predetermined model, and construct node set data by analyzing the legal case knowledge graph, where the text information includes historical and/or real-time claim information of a plaintiff, defense information of a defendant, evidence information provided by the plaintiff, evidence information provided by the defendant, and historical legal case information;

a sampling unit, configured to perform random-walk sampling on the node set data by using each node of the node set data as a starting point, so as to obtain a plurality of pieces of sequence data;

a first acquisition unit, configured to train the model by using a word2vec algorithm based on the plurality of pieces of sequence data, so as to obtain an updated target model;

a second construction unit, configured to obtain target text information, and analyze the target text information by using the target model, so as to construct a to-be-retrieved knowledge graph;

a second acquisition unit, configured to retrieve case information and first word embedding vector data associated with the to-be-retrieved knowledge graph from the legal case knowledge graph, and obtain second word embedding vector data of the to-be-retrieved knowledge graph;

a calculation unit, configured to calculate a first similarity and a second similarity of the case information based on the first word embedding vector data and the second word embedding vector data, and add the first similarity and the second similarity to obtain a target similarity, where the first similarity indicates a similarity of the case information in a content description, and the second similarity indicates a similarity of the case information in a logical relationship; and a sorting unit, configured to sort the case information in descending order of values of the target similarity, and output the sorted case information.

A third aspect of the embodiments of this application provides a knowledge graph-based case retrieval equipment, including a memory, a processor, and a computer program that is stored on the memory and can be run on the processor, where the processor implements a knowledge graph-based case retrieval method when executing the computer program, and the method includes:

constructing a legal case knowledge graph by analyzing text information based on a predetermined model, and constructing node set data by analyzing the legal case knowledge graph, where the text information includes historical and/or real-time claim information of a plaintiff, defense information of a defendant, evidence information provided by the plaintiff, evidence information provided by the defendant, and historical legal case information;

performing random-walk sampling on the node set data by using each node of the node set data as a starting point, so as to obtain a plurality of pieces of sequence data;

training the model by using a word2vec algorithm based on the plurality of pieces of sequence data, so as to obtain an updated target model;

obtaining target text information, and analyzing the target text information by using the target model, so as to construct a to-be-retrieved knowledge graph;

retrieving case information and first word embedding vector data associated with the to-be-retrieved knowledge graph from the legal case knowledge graph, and obtaining second word embedding vector data of the to-be-retrieved knowledge graph;

calculating a first similarity and a second similarity of the case information based on the first word embedding vector data and the second word embedding vector data, and adding the first similarity and the second similarity to obtain a target similarity, where the first similarity indicates a similarity of the case information in a content description, and the second similarity indicates a similarity of the case information in a logical relationship; and sorting the case information in descending order of values of the target similarity, and outputting the sorted case information.

A fourth aspect of the embodiments of this application provides a computer-readable storage medium including instructions, where when the instructions are run on a computer, the computer is enabled to perform a knowledge graph-based case retrieval method, including:

constructing a legal case knowledge graph by analyzing text information based on a predetermined model, and constructing node set data by analyzing the legal case knowledge graph, where the text information includes historical and/or real-time claim information of a plaintiff, defense information of a defendant, evidence information provided by the plaintiff, evidence information provided by the defendant, and historical legal case information;

performing random-walk sampling on the node set data by using each node of the node set data as a starting point, so as to obtain a plurality of pieces of sequence data;

training the model by using a word2vec algorithm based on the plurality of pieces of sequence data, so as to obtain an updated target model;

obtaining target text information, and analyzing the target text information by using the target model, so as to construct a to-be-retrieved knowledge graph;

retrieving case information and first word embedding vector data associated with the to-be-retrieved knowledge graph from the legal case knowledge graph, and obtaining second word embedding vector data of the to-be-retrieved knowledge graph;

calculating a first similarity and a second similarity of the case information based on the first word embedding vector data and the second word embedding vector data, and adding the first similarity and the second similarity to obtain a target similarity, where the first similarity indicates a similarity of the case information in a content description, and the second similarity indicates a similarity of the case information in a logical relationship; and sorting the case information in descending order of values of the target similarity, and outputting the sorted case information.

Beneficial Effect

Compared with the prior art, in the technical solutions provided by the embodiments of this application, a legal case knowledge graph is constructed based on text information; random-walk sampling is performed on node set data constructed based on the legal case knowledge graph, so as to obtain a plurality of pieces of sequence data; a model is trained by using a word2vec algorithm based on the plurality of pieces of sequence data, so as to obtain an updated target model; target text information is obtained, and the target text information is analyzed by using the target model, so as to construct a to-be-retrieved knowledge graph; the legal case knowledge graph is retrieved based on the to-be-retrieved knowledge graph, so as to obtain case information associated with the to-be-retrieved knowledge graph; and outputted case information is obtained based on a first similarity and a second similarity of the case information. According to the embodiments of this application, the case information of the legal case knowledge graph and the to-be-retrieved knowledge graph is more relevant, professional, and comprehensive in description, and the system is highly extensible and operable, so that the retrieval speed and accuracy are improved, and the number of user operations on the system is reduced to improve availability of the case retrieval system.

DESCRIPTION OF EMBODIMENTS

Figure 1:
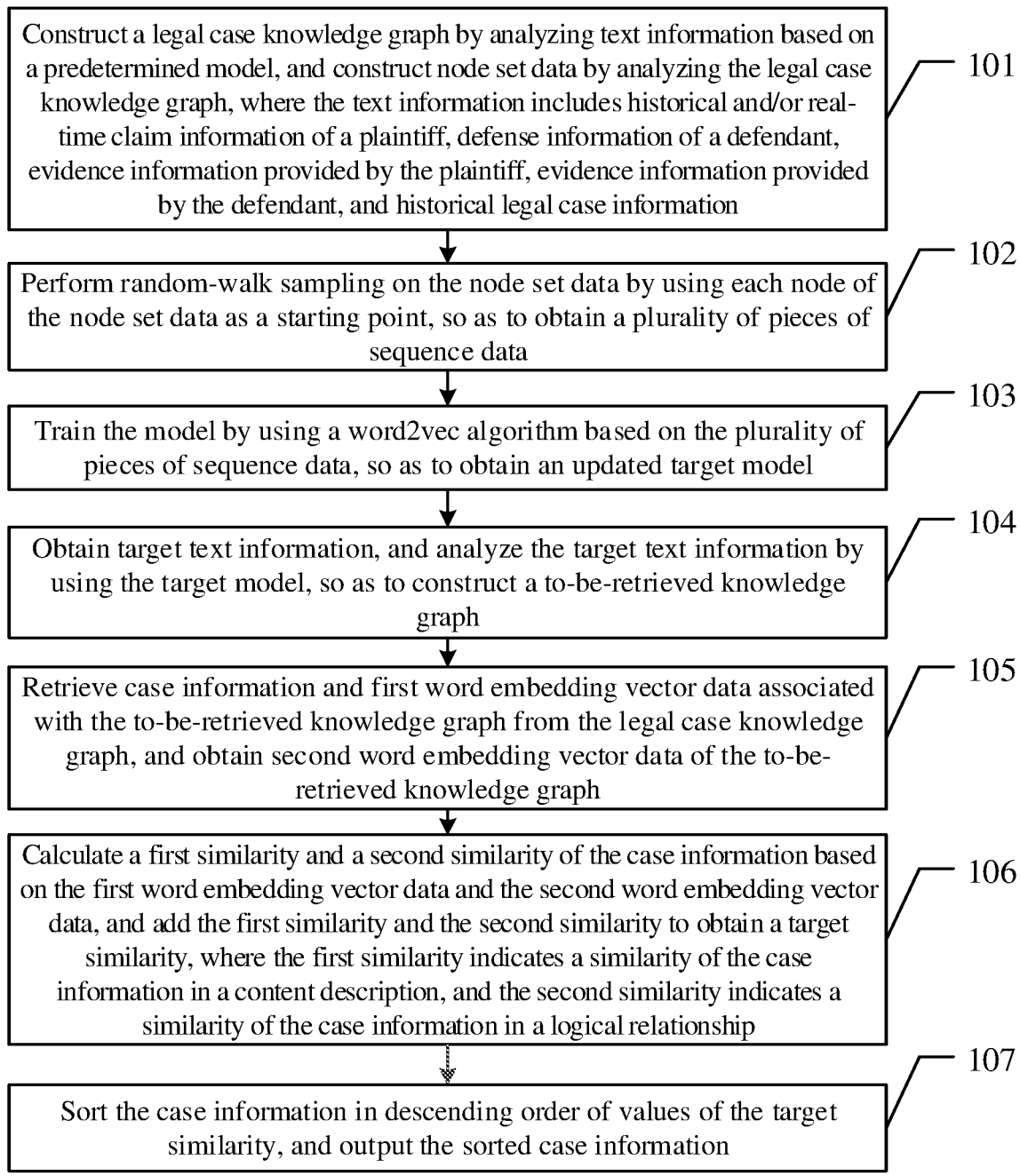
FIG. 1 is a schematic diagram of an embodiment of a knowledge graph-based case retrieval method according to an embodiment of this application.
Figure 8:
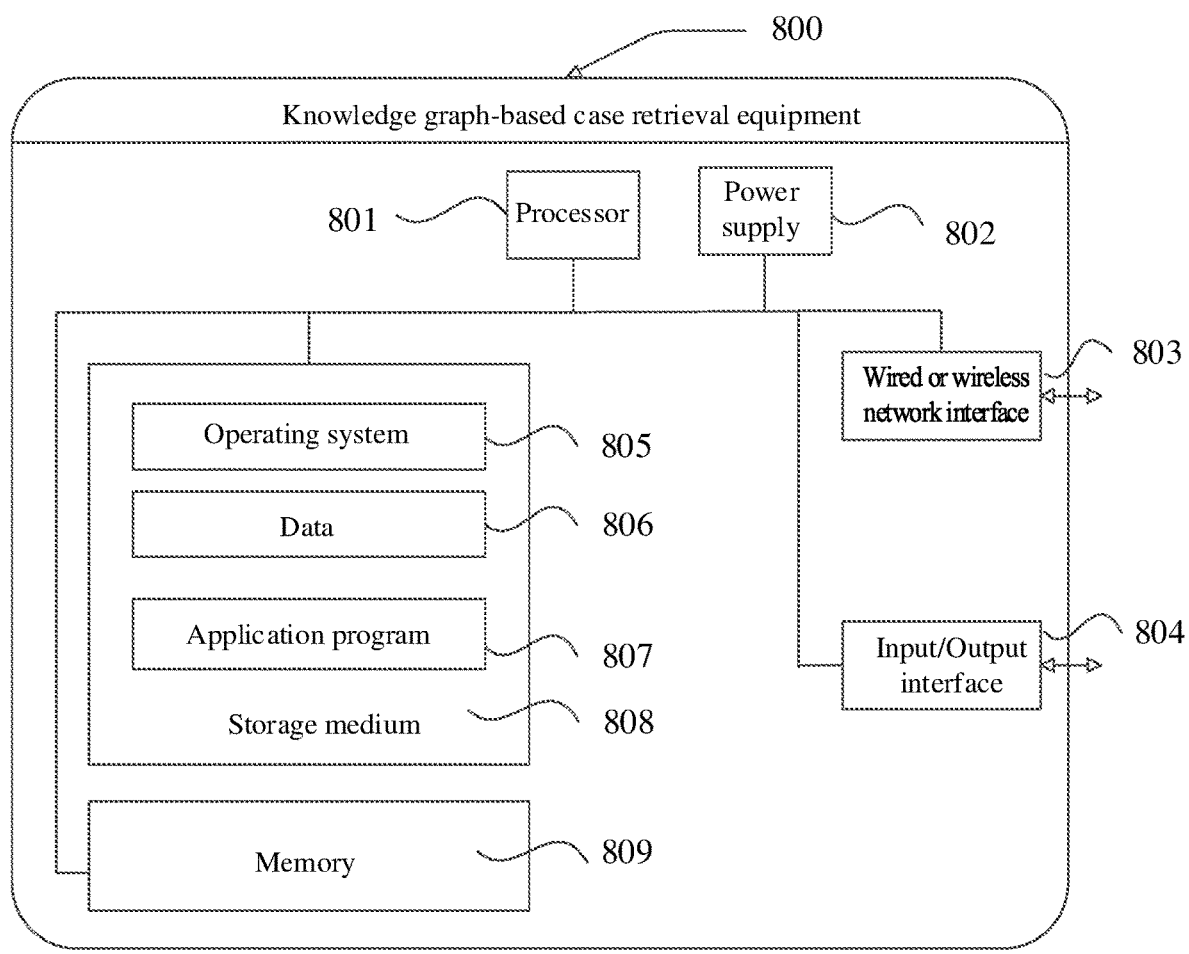
FIG. 8 is a schematic diagram of an embodiment of a knowledge graph-based case retrieval equipment in an embodiment of this application.

FIG. 1 is a flowchart of a knowledge graph-based case retrieval method according to an embodiment of this application. An example of the knowledge graph-based case retrieval method is provided below. The method is performed by a computer equipment, where the computer equipment may be a server or a terminal. When a device 80 shown in FIG. 8 is an application or an executable program, the terminal is a terminal on which the device 80 shown in FIG. 8 is installed. The type of an execution body is not limited in this application. The method specifically includes:

101. Construct a legal case knowledge graph by analyzing text information based on a predetermined model, and construct node set data by analyzing the legal case knowledge graph, where the text information includes historical and/or real-time claim information of a plaintiff, defense information of a defendant, evidence information provided by the plaintiff, evidence information provided by the defendant, and historical legal case information.

Figure 2:
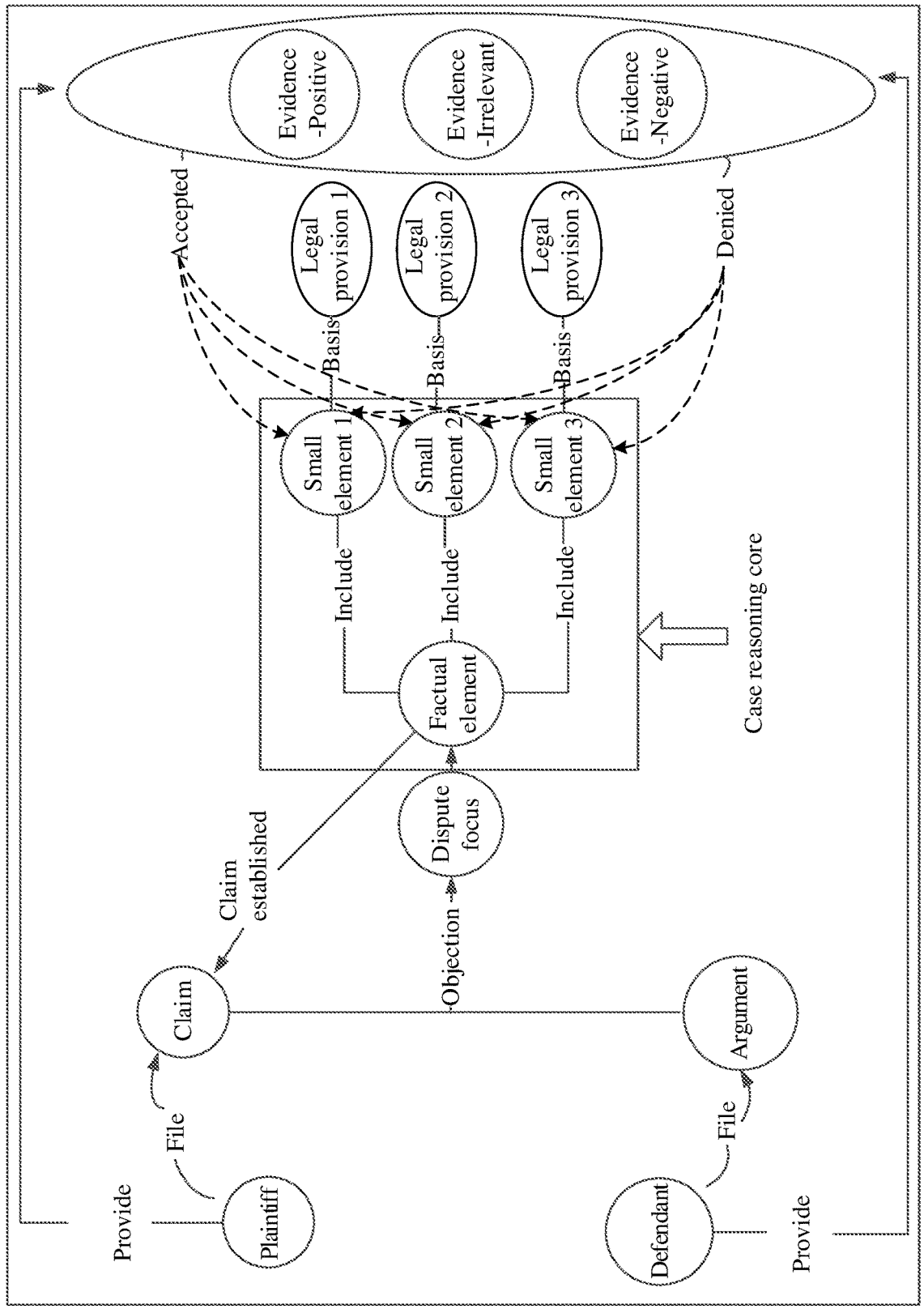
FIG. 2 is a schematic diagram of a constructed legal case knowledge graph according to an embodiment of this application.

A server constructs a legal case knowledge graph by analyzing text information based on a predetermined model, and constructs node set data by analyzing the legal case knowledge graph, where the text information includes historical and/or real-time claim information of a plaintiff, defense information of a defendant, evidence information provided by the plaintiff, evidence information provided by the defendant, and historical legal case information;

Specifically, the server performs data integration on the text information to remove noise in the text information and correct inconsistencies; combines a plurality of data sources of the text information into the same data storage; aggregates the text information, deletes redundant features, and clusters the text information; performs data conversion processing on the text information to compress the text information to a small interval and an expression that can be recognized by a machine, and performs word segmentation processing on the text information; performs feature extraction on segmented words to obtain feature information; invokes a predetermined convolutional neural network language model to interpret the feature information as structured data of a knowledge graph by using a Natural Language Processing (NLP) algorithm, where the structured data includes attributes, content corresponding to the attributes, and a relationship between the attributes; and creates a legal case knowledge graph based on the attributes, the content corresponding to the attributes, and the relationship between the attributes, as shown in FIG. 2. The legal case knowledge graph is analyzed, and the legal case knowledge graph is divided and recombined based on plaintiff information, claim information of a plaintiff, a dispute focus, a factual element, a small element, legal provision, evidence information provided by the plaintiff, and previous correlation, so as to construct tree-shaped node set data by using node data of the legal case knowledge graph. The content of FIG. 2 is for reference only, and accuracy of the content and actual operations are not considered.

102. Perform random-walk sampling on the node set data by using each node of the node set data as a starting point, so as to obtain a plurality of pieces of sequence data.

The server performs random-walk sampling on the node set data by using each node of the node set data as a starting point, so as to obtain a plurality of pieces of sequence data.

Specifically, unsupervised pre-training is performed by inputting the legal case knowledge graph deeply into a deepwalk algorithm model. The number n of iterations, the number m of steps, the number p of variables, and the number q of randomly generated vectors each time are set. The number k of random walks is initialized. Each node of the node set data is used as a starting point, the node set data is randomly walked for m steps by using a weight of a downstream node set at the starting point, and the random walk is performed k times. When the random walk is performed for m steps, if a current node does not have a downstream connection point, random walk stops at the node, and a plurality of pieces of sequence data are generated based on the variable data p and the number q of randomly generated vectors each time. The operation is iterated n times. When a series of random walks is completed, a better value of the sequence data is calculated. If the better value cannot be obtained, the step size is reset, and random-walk sampling is performed on the node set data until the better value is obtained. The better value can be calculated by calculating a minimum value of the opposite number of a target function, and a test function is as follows:

$$f = \frac{\sin\left(\sqrt{(x-\tau)^2 + (y-\tau)^2} + e\right)}{\sqrt{(x-\tau)^2 + (y-\tau)^2} + e} + 1, 0 \leq x, y \leq 2\tau,$$

where x and y denote coordinates of the node at which the random walk stops, τ denotes a value range of the global maximum value, and e denotes control accuracy.

103. Train the model by using a word2vec algorithm based on the plurality of pieces of sequence data, so as to obtain an updated target model.

The server trains the model based on the plurality of pieces of sequence data by using the word2vec algorithm, so as to obtain an updated target model.

Specifically, the plurality of pieces of sequence data are analyzed by using the word2vec algorithm, so as to train and update the model. Words in the plurality of pieces of sequence data can be converted into vector representations through an input layer to obtain word vectors. A hidden layer calculates a cumulative sum of the word vectors output by the input layer to obtain a total vector, where the total vector is connected to each non-leaf node of a Huffman tree of an output layer, the Huffman tree is constructed from the total vector according to a semantic relationship and a context relationship, and probability calculation is performed on the Huffman tree by using an energy function.

104. Obtain target text information, and analyze the target text information by using the target model, so as to construct a to-be-retrieved knowledge graph.

The server obtains the target text information and analyzes the target text information by using the target model, so as to construct a to-be-retrieved knowledge graph.

Specifically, the server performs data integration on the text information to remove noise in the text information and correct inconsistencies; combines a plurality of data sources of the text information into the same data storage; aggregates the text information, deletes redundant features, and clusters the text information; performs data conversion processing on the text information to compress the text information to a small interval and an expression that can be recognized by a machine, and performs word segmentation processing on the text information; performs feature extraction on segmented words to obtain feature information; invokes a predetermined convolutional neural network language model to interpret the feature information as structured data of a knowledge graph by using an NLP algorithm, where the structured data includes attributes, content corresponding to the attributes, and a relationship between the attributes; and creates a to-be-retrieved knowledge graph based on the attributes, the content corresponding to the attributes, and the relationship between the attributes.

105. Retrieve case information and first word embedding vector data associated with the to-be-retrieved knowledge graph from the legal case knowledge graph, and obtain second word embedding vector data of the to-be-retrieved knowledge graph.

The server retrieves the legal case knowledge graph, so as to obtain the case information and the first word embedding vector data associated with the to-be-retrieved knowledge graph, and obtain the second word embedding vector data of the to-be-retrieved knowledge graph.

Specifically, feature extraction is performed on the to-be-retrieved knowledge graph, and a relationship between the feature information is analyzed to obtain associated feature information, where the associated feature information includes cause information and case type information; and the legal case knowledge graph is traversed based on the associated feature information, so as to obtain the same and/or similar case information, the first word embedding vector data corresponding to the case information, and the second word embedding vector data of the to-be-retrieved knowledge graph, so as to calculate, based on the first word embedding vector data and the second word embedding vector data, a similarity in the relationship between and a similarity in the content of the nodes of the to-be-retrieved knowledge graph and the nodes of the legal case knowledge graph.

106. Calculate a first similarity and a second similarity of the case information based on the first word embedding vector data and the second word embedding vector data, and add the first similarity and the second similarity to obtain a target similarity, where the first similarity indicates a similarity of the case information in a content description, and the second similarity indicates a similarity of the case information in a logical relationship.

The server calculates the first similarity in content description and the second similarity in the logical relationship of the case information based on the first word embedding vector data and the second word embedding vector data, and adds the first similarity and the second similarity to obtain the target similarity.

Specifically, a similarity in the content description between the first word embedding vector data and the second word embedding vector data is calculated to obtain the first similarity of the case information, a similarity in the logical relationship between the first word embedding vector data and the second word embedding vector data is calculated to obtain the second similarity of the case information, and a sum of the first similarity and the second similarity is used as the target similarity.

Figure 3:
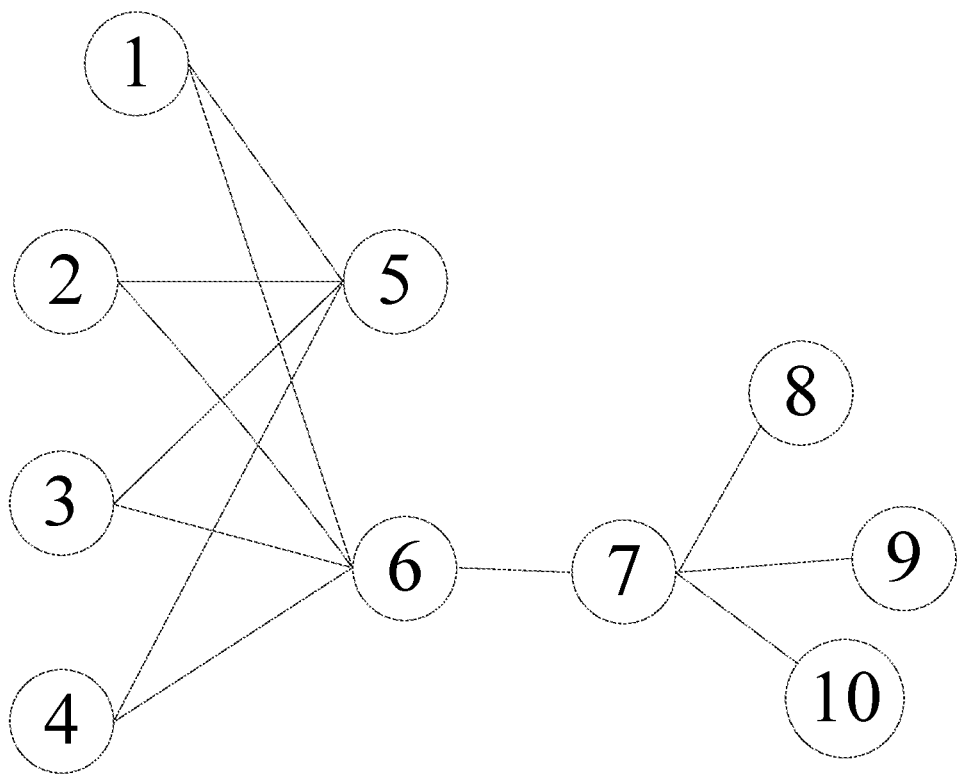
FIG. 3 is a schematic diagram of a to-be-retrieved knowledge graph for comparison in obtaining a target similarity according to an embodiment of this application.
Figure 4:
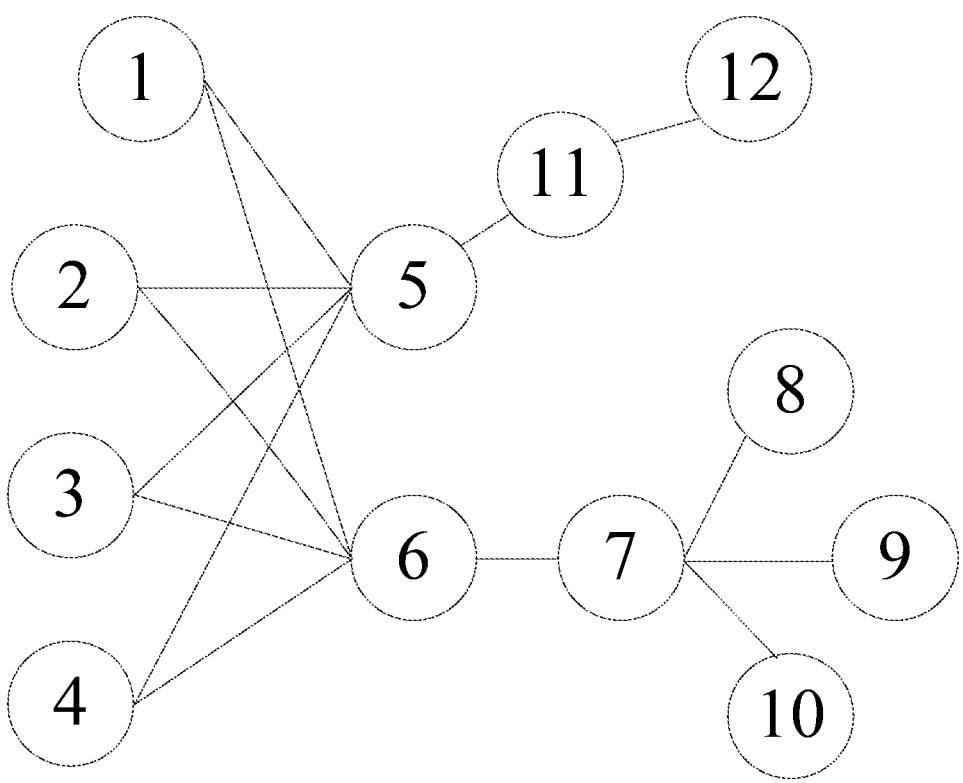
FIG. 4 is a schematic diagram of a legal case knowledge graph for comparison in obtaining a target similarity according to an embodiment of this application.

The value obtained by adding values of the similarities corresponding to a plurality of nodes in the legal case knowledge graph is used as the similarity between a legal case corresponding to the legal case knowledge graph and a to-be-retrieved case input by a user, so that the retrieval accuracy is improved. For example, as shown in FIG. 3 and FIG. 4, FIG. 3 is a to-be-retrieved knowledge graph, and FIG. 4 is a legal case knowledge graph. If a sum of the second similarities corresponding to a node 6, a node 8, a node 9, and a node 10 in FIG. 4 is closest to a sum of the similarities corresponding to a node 6, a node 8, a node 9, and a node 10 in FIG. 3, a node 7 in FIG. 4 is most similar to a node 7 in FIG. 3.

The content of the foregoing examples, the content of FIG. 3, and the content of FIG. 4 are for reference only, and accuracy of the content and actual operations thereof are not considered.

107. Sort the case information in descending order of values of the target similarity, and output the sorted case information.

The server sorts the case information in descending order of the values of the target similarity, and outputs the sorted case information.

Specifically, the case information is sorted in descending order of the values of the target similarity to obtain the sorted case information, and the sorted case information is explained, where the content of the explanation includes the similarity between the case information and the input text information, the judgment opinion of the case information, the direction of evidence extraction of the case information, and the like. Text information is generated based on the case information and explanation, and the similarity of each part in the case information is collected and analyzed, so as to generate a visual graph. When the case output condition input by the user is received, a text and a visual graph of the case information satisfying the case output condition are output, where the case output condition includes but is not limited to a sorting range or a similarity range of the case information.

Figure 5:
FIG. 5 is a schematic diagram of another embodiment of a knowledge graph-based case retrieval method according to an embodiment of this application.

Referring to FIG. 5, another embodiment of a knowledge graph-based case retrieval method according to an embodiment of this application includes:

501. Construct a legal case knowledge graph by analyzing text information based on a predetermined model, and construct node set data by analyzing the legal case knowledge graph, where the text information includes historical and/or real-time claim information of a plaintiff, defense information of a defendant, evidence information provided by the plaintiff, evidence information provided by the defendant, and historical legal case information.

A server constructs a legal case knowledge graph by analyzing text information based on a predetermined model, and constructs node set data by analyzing the legal case knowledge graph, where the text information includes historical and/or real-time claim information of a plaintiff, defense information of a defendant, evidence information provided by the plaintiff, evidence information provided by the defendant, and historical legal case information;

Specifically, the server performs data integration on the text information to remove noise in the text information and correct inconsistencies; combines a plurality of data sources of the text information into the same data storage; aggregates the text information, deletes redundant features, and clusters the text information; performs data conversion processing on the text information to compress the text information to a small interval and an expression that can be recognized by a machine, and performs word segmentation processing on the text information; performs feature extraction on segmented words to obtain feature information; invokes a predetermined convolutional neural network language model to interpret the feature information as structured data of a knowledge graph by using a Natural Language Processing (NLP) algorithm, where the structured data includes attributes, content corresponding to the attributes, and a relationship between the attributes; and creates a legal case knowledge graph based on the attributes, the content corresponding to the attributes, and the relationship between the attributes, as shown in FIG. 2. The legal case knowledge graph is analyzed, and the legal case knowledge graph is divided and recombined based on plaintiff information, claim information of a plaintiff, a dispute focus, a factual element, a small element, legal provision, evidence information provided by the plaintiff, and previous correlation, so as to construct tree-shaped node set data by using node data of the legal case knowledge graph. The content of FIG. 2 is for reference only, and accuracy of the content and actual operations are not considered.

Optionally, the constructing a legal case knowledge graph by analyzing text information based on a predetermined model specifically includes: creating a blockchain structure network, and obtaining text information stored in the blockchain structure network, where the blockchain is used to link data of each legal case query and/or management platform; performing lexical analysis, syntactic analysis, and semantic analysis on the text information to obtain structured data, and converting the structured data into markup language data; performing entity extraction on the markup language data to obtain entity information, performing relationship extraction on the markup language data to obtain relationship information, and performing attribute extraction on the markup language data to obtain attribute information, where the entity information includes a name of a person, a name of an organization, a geographic location, an event/date, a character value, and an amount value involved in a legal case, and the relationship information includes a relationship between at least two of a factual element, a person, an evidence, a dispute focus, and a legal provision; and performing information fusion processing on the entity information, the relationship information, and the attribute information to obtain fusion processing information; constructing a data model based on the fusion processing information to obtain a legal case knowledge graph; and storing the legal case knowledge graph in a relational database management system MySQL database of the blockchain structure network. Historical data and real-time data of a plurality of platforms are obtained through the blockchain structure network, so as to provide a robust basis for construction of the legal case knowledge graph; and the legal case knowledge graph is constructed quickly and accurately based on characteristics of a blockchain structure network, such as low cost, high efficiency, and secure data storage.

502. Perform random-walk sampling on the node set data by using each node of the node set data as a starting point, so as to obtain a plurality of pieces of sequence data.

The server performs random-walk sampling on the node set data by using each node of the node set data as a starting point, so as to obtain a plurality of pieces of sequence data.

Specifically, unsupervised pre-training is performed by inputting the legal case knowledge graph deeply into a deepwalk algorithm model. The number n of iterations, the number m of steps, the number p of variables, and the number q of randomly generated vectors each time are set. The number k of random walks is initialized. Each node of the node set data is used as a starting point, the node set data is randomly walked for m steps by using a weight of a downstream node set at the starting point, and the random walk is performed k times. When the random walk is performed for m steps, if a current node does not have a downstream connection point, random walk stops at the node, and a plurality of pieces of sequence data are generated based on the variable data p and the number q of randomly generated vectors each time. The operation is iterated n times. When a series of random walks is completed, a better value of the sequence data is calculated. If the better value cannot be obtained, the step size is reset, and random-walk sampling is performed on the node set data until the better value is obtained. The better value can be calculated by calculating a minimum value of the opposite number of a target function, and a test function is as follows:

$$f = \frac{\sin\left(\sqrt{(x-\tau)^2 + (y-\tau)^2} + e\right)}{\sqrt{(x-\tau)^2 + (y-\tau)^2} + e} + 1, 0 \le x, y \le 2\tau,$$

where x and y denote coordinates of the node at which the random walk stops, τ denotes a value range of the global maximum value, and e denotes control accuracy.

Optionally, the performing random-walk sampling on the node set data by using each node of the node set data as a starting point, so as to obtain a plurality of pieces of sequence data specifically includes: obtaining a weight of a next node of the starting point by using each node of the node set data as the starting point; analyzing the weight, so as to set a random walk step number, and analyzing the number of nodes of a branch on which the starting point is located, so as to set a random walk step number threshold; when it is determined that the random walk step number is less than the random walk step number threshold, walking along a node connected to the next node of the starting point based on the random walk step number, generating random walk sequence data, and obtaining the plurality of pieces of sequence data; and when it is determined that the random walk step number is greater than or equal to the random walk step number threshold, walking along a node connected to the next node of the starting point based on the random walk step number threshold, generating random walk sequence data, and obtaining the plurality of pieces of sequence data.

Optionally, the performing random-walk sampling on the node set data by using each node of the node set data as a starting point, so as to obtain a plurality of pieces of sequence data specifically includes: obtaining a weight of a downstream node other than the starting point by using each node of the node set data as the starting point, and determining a current iteration number based on the weight; randomly walking the node set data based on a predetermined path length and the current iteration number; when it is detected that the current iteration number is less than a predetermined iteration threshold, randomly generating a multidimensional vector before [−1,1] and a multivariate function in which the multidimensional vector is located; calculating a function value of the multivariate function; if it is detected that the function value reaches a first predetermined threshold and the predetermined path length is less than control precision, stopping random walking of the node set data, and obtaining sequence data generated when random walking is performed on the node set data, where the control precision is used to stop random walking of the node set data; and if it is detected that the function value does not reach the first predetermined threshold and the predetermined path length is not less than the control precision, setting the walk step size of the random walk to be half of the predetermined path length, performing random walk on the node set data again based on the set walk step size of the random walk until the function value reaches the first predetermined threshold and the predetermined path length is less than the control precision, and obtaining sequence data generated when the random walk is performed on the node set data.

503. Train the model by using a word2vec algorithm based on the plurality of pieces of sequence data, so as to obtain an updated target model.

The server trains the model based on the plurality of pieces of sequence data by using the word2vec algorithm, so as to obtain an updated target model.

Specifically, the plurality of pieces of sequence data are analyzed by using the word2vec algorithm, so as to train and update the model. Words in the plurality of pieces of sequence data can be converted into vector representations through an input layer to obtain word vectors. A hidden layer calculates a cumulative sum of the word vectors output by the input layer to obtain a total vector, where the total vector is connected to each non-leaf node of a Huffman tree of an output layer, the Huffman tree is constructed from the total vector according to a semantic relationship and a context relationship, and probability calculation is performed on the Huffman tree by using an energy function.

Optionally, the training the model by using a word2vec algorithm based on the plurality of pieces of sequence data, so as to obtain an updated target model specifically includes: creating a Huffman tree by using the model based on the plurality of pieces of sequence data, where the model includes a fully connected layer, a plurality of connected layers, and a normalized Softmax classifier; analyzing each word in the Huffman tree through the fully connected layer, so as to obtain a plurality of one-hot vectors of a predetermined length; performing gradient iterative processing on the plurality of one-hot vectors of the predetermined length through a plurality of connected layers, so as to obtain column vector data; and processing the column vector data by using the Softmax classifier, so as to obtain word embedding vector data.

Optionally, after obtaining the word embedding vector data, the method further includes: setting a type by using a HashTable[MaxSize] function; obtaining a keyword of the word embedding vector data and a keyword sequence, and extracting record information about searching, deleting and inserting keywords in the hash table by using an address acquisition function, where the address acquisition function is as follows:

$$H_i(key)=(key \% p+i)\% m, (1 \le i \le m-1),$$

where key is a keyword, m is a hash table length, i is an incremental sequence of the word embedding vector data, and p is a predetermined prime number; and creating a hash table based on the type and the record information, initializing the hash table, inserting a keyword sequence into the hash table, and setting an average search length of the hash table. Records are accessed by mapping a keycode value of the word embedding vector data to a location in the hash table, so as to store information about historical cases and improve efficiency of case retrieval.

Optionally, before processing the column vector data by using the Softmax classifier, the method further includes: encoding the column vector data into ordered frame sequence information, and setting a timer for the ordered frame sequence information, where the timer includes a timer whose timing duration is greater than a round-trip time of the ordered frame sequence information; setting an automatic repeat request ARQ protocol and a sliding window protocol, and setting a transmission sliding window connected to a connected layer of the Softmax classifier, and setting a reception sliding window of the Softmax classifier, where the sliding window protocol includes a transmission rule of the column vector data, and the transmission sliding window includes a sliding window whose window size is a maximum number of transmission frames; and transmitting the ordered frame sequence information to the Softmax classifier based on the ARQ protocol, the sliding window protocol, the transmission sliding window, and the reception sliding window, and feeding, by using the Softmax classifier, information back to the connected layer that is connected. Transmission of the column vector data is controlled by using the sliding window, so as to prevent data blockage and loss, and separate the historical column vector data from the current column vector data, so that the processing speed of the current column vector data is not reduced when the historical column vector data increases, thereby improving the case processing efficiency of the case retrieval system. By controlling the data transmission volume, the buffer pressure of the system is reduced, and the transmission efficiency is improved.

504. Obtain target text information, and analyze the target text information by using the target model, so as to construct a to-be-retrieved knowledge graph.

The server obtains the target text information and analyzes the target text information by using the target model, so as to construct a to-be-retrieved knowledge graph.

Specifically, the server performs data integration on the text information to remove noise in the text information and correct inconsistencies; combines a plurality of data sources of the text information into the same data storage; aggregates the text information, deletes redundant features, and clusters the text information; performs data conversion processing on the text information to compress the text information to a small interval and an expression that can be recognized by a machine, and performs word segmentation processing on the text information; performs feature extraction on segmented words to obtain feature information; invokes a predetermined convolutional neural network language model to interpret the feature information as structured data of a knowledge graph by using an NLP algorithm, where the structured data includes attributes, content corresponding to the attributes, and a relationship between the attributes; and creates a to-be-retrieved knowledge graph based on the attributes, the content corresponding to the attributes, and the relationship between the attributes.

505. Retrieve case information and first word embedding vector data associated with the to-be-retrieved knowledge graph from the legal case knowledge graph, and obtain second word embedding vector data of the to-be-retrieved knowledge graph.

The server retrieves the legal case knowledge graph, so as to obtain the case information and the first word embedding vector data associated with the to-be-retrieved knowledge graph, and obtain the second word embedding vector data of the to-be-retrieved knowledge graph.

Specifically, feature extraction is performed on the to-be-retrieved knowledge graph, and a relationship between the feature information is analyzed to obtain associated feature information, where the associated feature information includes cause information and case type information; and the legal case knowledge graph is traversed based on the associated feature information, so as to obtain the same and/or similar case information, the first word embedding vector data corresponding to the case information, and the second word embedding vector data of the to-be-retrieved knowledge graph, so as to calculate, based on the first word embedding vector data and the second word embedding vector data, a similarity in the relationship between and a similarity in the content of the nodes of the to-be-retrieved knowledge graph and the nodes of the legal case knowledge graph.

506. Calculate a factual element similarity, a dispute focus similarity, an evidence similarity, a dispute focus association similarity, an evidence association similarity, and a factual element association similarity between the case information and the target text information based on the first word embedding vector data and the second word embedding vector data.

The server calculates the factual element similarity, the dispute focus similarity, the evidence similarity, the dispute focus association similarity, the evidence association similarity, and the factual element association similarity between the case information and the target text information based on the first word embedding vector data and the second word embedding vector data.

Specifically, the first word embedding vector data of the dispute focus, the evidence and the factual element are respectively obtained, the second word embedding vector data of the dispute focus, the evidence and the factual element are respectively obtained, the similarity between the first word embedding vector data of the dispute focus and the second word embedding vector data of the dispute focus is calculated to obtain the dispute focus similarity, the similarity between the first word embedding vector data of the evidence and the second word embedding vector data of the evidence is calculated to obtain the evidence similarity, and the similarity between the first word embedding vector data of the factual element and the second word embedding vector data of the factual element is calculated to obtain the factual element similarity. The dispute focus association similarity, the evidence association similarity, and the factual element association similarity between the first word embedding vector data and the second word embedding vector data are respectively calculated, so as to respectively obtain the dispute focus association similarity, the evidence association similarity and the factual element association similarity between the case information and the target text information.

507. Calculate a weighted average of the factual element similarity, the dispute focus similarity, and the evidence similarity based on a first predetermined weight ratio, so as to obtain the first similarity of the case information; and calculate a weighted average of the dispute focus association similarity, the evidence association similarity, and the factual element association similarity based on a second predetermined weight ratio, so as to obtain the second similarity of the case information.

The server calculates the weighted average of the factual element similarity, the dispute focus similarity, and the evidence similarity based on the first predetermined weight ratio, so as to obtain the first similarity of the case information; and calculates the weighted average of the dispute focus association similarity, the evidence association similarity, and the factual element association similarity based on the second predetermined weight ratio, so as to obtain the second similarity of the case information.

Specifically, the weighted average of the similarity between the first word embedding vector data and the second word embedding vector data is calculated based on the predetermined weight to obtain the first similarity, where the predetermined weight is set in descending order of the dispute focus weight, the evidence weight, and the factual element weight. For example, the dispute focus weight, the evidence weight, and the factual element weight are 40%, 35%, and 25%, respectively. If the calculated dispute focus similarity is 0.5, the calculated evidence similarity is 0.2, and the calculated factual element similarity is 0.3, the first similarity is =0.4*0.5+0.35*0.2+0.25*0.3=1.55. The weighted average of the similarity between the first word embedding vector data and the second word embedding vector data is calculated based on the predetermined weight to obtain the first similarity, where the predetermined weight is set in descending order of the dispute focus weight, the evidence weight, and the factual element weight.

508. Identify and obtain a first similarity that is greater than a first predetermined threshold, and identify and obtain a second similarity that is greater than a second predetermined threshold.

The server identifies and obtains the first similarity that is greater than the first predetermined threshold, and identifies and obtains the second similarity that is greater than the second predetermined threshold.

Specifically, whether the first similarity is greater than the first predetermined threshold is determined, and the first similarity that is greater than the first predetermined threshold is selected; and whether the second similarity is greater than the second predetermined threshold is determined, and the second similarity that is greater than the second predetermined threshold is selected. The first similarity and the second similarity are selected to reduce subsequent calculation operations, so that the quality and accuracy of data analysis can be ensured and the operation efficiency can be improved.

509. Calculate a weighted average of the obtained first similarity based on a third predetermined weight ratio, so as to obtain a target first similarity; and calculate a weighted average of the obtained second similarity based on a fourth predetermined weight ratio, so as to obtain a target second similarity.

The server calculates the weighted average of the obtained first similarity based on the third predetermined weight ratio, so as to obtain the target first similarity; and calculates the weighted average of the obtained second similarity based on the fourth predetermined weight ratio, so as to obtain the target second similarity.

Specifically, the weighted average of the first similarity that is greater than the first predetermined threshold is calculated based on the third predetermined weight ratio, so as to obtain a total similarity, that is, the target first similarity. The weighted average of the second similarity that is greater than the second predetermined threshold is calculated based on the fourth predetermined weight ratio, so as to obtain a total similarity, that is, the target second similarity. The third predetermined weight may be set based on a similarity range value of the first similarity that is greater than the first predetermined threshold. For example, if first similarities that are greater than the first predetermined threshold include 0.2, 0.35, 0.15, 0.55, 0.5, 0.27, 0.87, and 0.9, the weight of the first similarities 0.15, 0.2, and 0.27 may be set to 0.32, the weight of the first similarities 0.35, 0.5, and 0.55 may be set to 0.3, and the weight of the first similarities 0.87 and 0.9 may be set to 0.38. The fourth predetermined weight may be obtained in a similar way. The content of foregoing examples is for reference only, and accuracy of the content and actual operations are not considered.

510. Add the target first similarity and the target second similarity, so as to obtain a target similarity.

The server adds the target first similarity and the target second similarity, so as to obtain the target similarity. The value obtained by adding values of the similarities corresponding to a plurality of nodes in the legal case knowledge graph is used as the similarity between a legal case corresponding to the legal case knowledge graph and a to-be-retrieved case input by a user, so that the retrieval accuracy is improved.

511. Sort the case information in descending order of values of the target similarity, and output the sorted case information.

The server sorts the case information in descending order of the values of the target similarity, and outputs the sorted case information.

The sorting the case information in descending order of values of the target similarity, and outputting the sorted case information specifically includes: sorting the case information in descending order of the values of the target similarity; receiving a case output condition input by a user, and determining target case information based on the case output condition, where the case output condition includes at least one of a sorting range and a similarity range; and collecting and analyzing the target case information, and generating and outputting a visual graph and text information. The case information is sorted in descending order of the values of the target similarity to obtain the sorted case information, and the sorted case information is explained, where the content of the explanation includes the similarity between the case information and the input text information, the judgment opinion of the case information, the direction of evidence extraction of the case information, and the like. The text information is generated based on the case information and explanation, and the similarity of each part in the case information is collected and analyzed, so as to generate the visual graph. When the case output condition input by the user is received, a text and a visual graph of the case information satisfying the case output condition are output, where the case output condition includes but is not limited to a sorting range or a similarity range of the case information.

Figure 6:
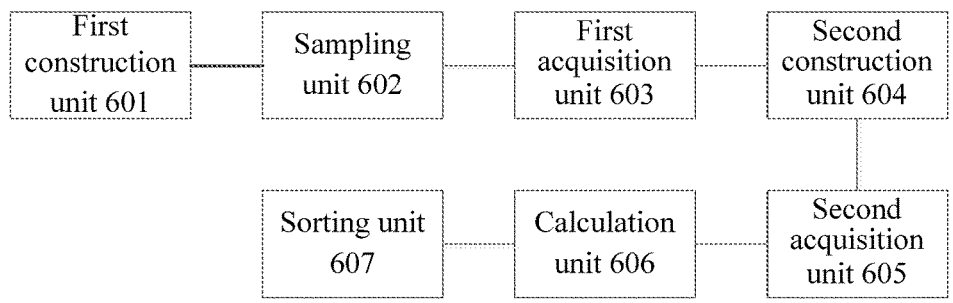
FIG. 6 is a schematic diagram of an embodiment of a knowledge graph-based case retrieval device according to an embodiment of this application.

The foregoing has described the knowledge graph-based case retrieval method according to the embodiments of this application. The following describes a knowledge graph-based case retrieval device according to the embodiments of this application. Referring to FIG. 6, an embodiment of the knowledge graph-based case retrieval device according to an embodiment of this application includes:

a first construction unit 601, configured to construct a legal case knowledge graph by analyzing text information based on a predetermined model, and construct node set data by analyzing the legal case knowledge graph, where the text information includes historical and/or real-time claim information of a plaintiff, defense information of a defendant, evidence information provided by the plaintiff, evidence information provided by the defendant, and historical legal case information;

a sampling unit 602, configured to perform random-walk sampling on the node set data by using each node of the node set data as a starting point, so as to obtain a plurality of pieces of sequence data;

a first acquisition unit 603, configured to train the model by using a word2vec algorithm based on the plurality of pieces of sequence data, so as to obtain an updated target model;

a second construction unit 604, configured to obtain target text information, and analyze the target text information by using the target model, so as to construct a to-be-retrieved knowledge graph;

a second acquisition unit 605, configured to retrieve case information and first word embedding vector data associated with the to-be-retrieved knowledge graph from the legal case knowledge graph, and obtain second word embedding vector data of the to-be-retrieved knowledge graph;

a calculation unit 606, configured to calculate a first similarity and a second similarity of the case information based on the first word embedding vector data and the second word embedding vector data, and add the first similarity and the second similarity to obtain a target similarity, where the first similarity indicates a similarity of the case information in a content description, and the second similarity indicates a similarity of the case information in a logical relationship; and a sorting unit 607, configured to sort the case information in descending order of values of the target similarity, and output the sorted case information.

Figure 7:
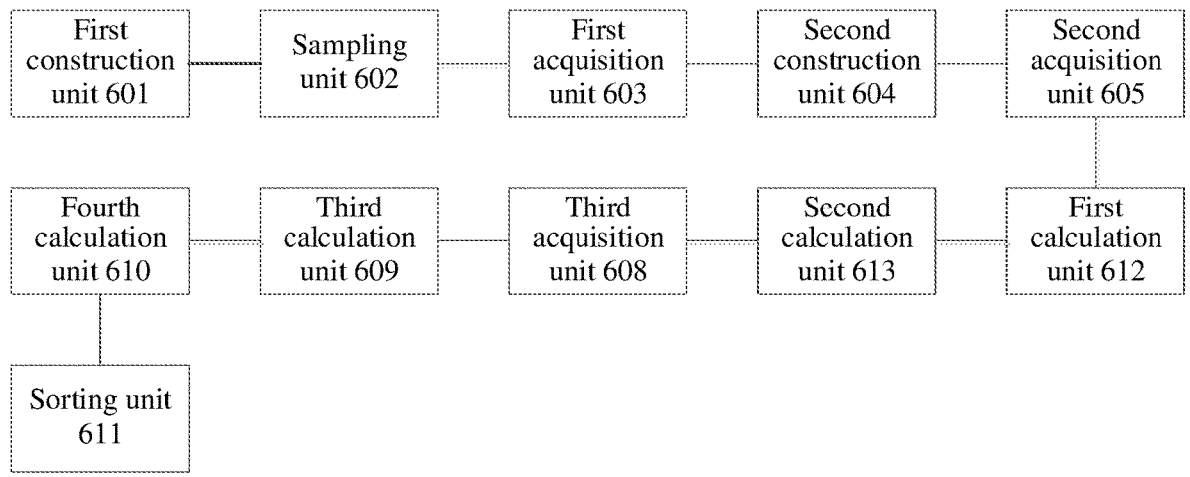
FIG. 7 is a schematic diagram of another embodiment of a knowledge graph-based case retrieval device according to an embodiment of this application.

Referring to FIG. 7, another embodiment of a knowledge graph-based case retrieval device according to an embodiment of this application includes:

a first construction unit 601, configured to construct a legal case knowledge graph by analyzing text information based on a predetermined model, and construct node set data by analyzing the legal case knowledge graph, where the text information includes historical and/or real-time claim information of a plaintiff, defense information of a defendant, evidence information provided by the plaintiff, evidence information provided by the defendant, and historical legal case information;

a sampling unit 602, configured to perform random-walk sampling on the node set data by using each node of the node set data as a starting point, so as to obtain a plurality of pieces of sequence data;

a first acquisition unit 603, configured to train the model by using a word2vec algorithm based on the plurality of pieces of sequence data, so as to obtain an updated target model;

a second construction unit 604, configured to obtain target text information, and analyze the target text information by using the target model, so as to construct a to-be-retrieved knowledge graph;

a second acquisition unit 605, configured to retrieve case information and first word embedding vector data associated with the to-be-retrieved knowledge graph from the legal case knowledge graph, and obtain second word embedding vector data of the to-be-retrieved knowledge graph;

a first calculation unit 612, configured to calculate a factual element similarity, a dispute focus similarity, an evidence similarity, a dispute focus association similarity, an evidence association similarity, and a factual element association similarity between the case information and the target text information based on the first word embedding vector data and the second word embedding vector data;

a second calculation unit 613, configured to calculate a weighted average of the factual element similarity, the dispute focus similarity, and the evidence similarity based on a first predetermined weight ratio, so as to obtain a first similarity of the case information; and calculate a weighted average of the dispute focus association similarity, the evidence association similarity, and the factual element association similarity based on a second predetermined weight ratio, so as to obtain a second similarity of the case information;

a third acquisition unit 608, configured to identify and obtain a first similarity that is greater than a first predetermined threshold, and identify and obtain a second similarity that is greater than a second predetermined threshold;

a third calculation unit 609, configured to calculate a weighted average of the obtained first similarity based on a third predetermined weight ratio, so as to obtain a target first similarity; and calculate a weighted average of the obtained second similarity based on a fourth predetermined weight ratio, so as to obtain a target second similarity;

a fourth calculation unit 610, configured to add the target first similarity and the target second similarity, so as to obtain a target similarity; and a sorting unit 611, configured to sort the case information in descending order of values of the target similarity, and output the sorted case information.

Optionally, the first construction unit 601 is specifically configured to: create a blockchain structure network, and obtain text information stored in the blockchain structure network, where the blockchain is used to link data of each legal case query and/or management platform; perform lexical analysis, syntactic analysis, and semantic analysis on the text information to obtain structured data, and convert the structured data into markup language data; perform entity extraction on the markup language data to obtain entity information, perform relationship extraction on the markup language data to obtain relationship information, and perform attribute extraction on the markup language data to obtain attribute information, where the entity information includes a name of a person, a name of an organization, a geographic location, an event/date, a character value, and an amount value involved in a legal case, and the relationship information includes a relationship between at least two of a factual element, a person, an evidence, a dispute focus, and a legal provision; and perform information fusion processing on the entity information, the relationship information, and the attribute information to obtain fusion processing information; construct a data model based on the fusion processing information to obtain a legal case knowledge graph; and store the legal case knowledge graph in a relational database management system MySQL database of the blockchain structure network.

Optionally, the sampling unit 602 is specifically configured to: obtain a weight of a next node of the starting point by using each node of the node set data as the starting point; analyze the weight, so as to set a random walk step number, and analyze the number of nodes of a branch where the starting point is located, so as to set a random walk step number threshold; when it is determined that the random walk step number is less than the random walk step number threshold, walk along a node connected to the next node of the starting point based on the random walk step number, generate random walk sequence data, and obtain the plurality of pieces of sequence data; and when it is determined that the random walk step number is greater than or equal to the random walk step number threshold, walk along a node connected to the next node of the starting point based on the random walk step number threshold, generate random walk sequence data, and obtain the plurality of pieces of sequence data.

Optionally, the sampling unit 602 is further specifically configured: obtain a weight of a downstream node other than the starting point by using each node of the node set data as the starting point, and determine a current iteration number based on the weight; randomly walk the node set data based on a predetermined path length and the current iteration number; when it is detected that the current iteration number is less than a predetermined iteration threshold, randomly generate a multidimensional vector before [−1,1] and a multivariate function in which the multidimensional vector is located; calculate a function value of the multivariate function; if it is detected that the function value reaches a first predetermined threshold and the predetermined path length is less than control precision, stop random walking of the node set data, and obtain sequence data generated when random walking is performed on the node set data, where the control precision is used to stop random walking of the node set data; and if it is detected that the function value does not reach the first predetermined threshold and the predetermined path length is not less than the control precision, set the walk step size of the random walk to be half of the predetermined path length, perform random walk on the node set data again based on the set walk step size of the random walk until the function value reaches the first predetermined threshold and the predetermined path length is less than the control precision, and obtain sequence data generated when the random walk is performed on the node set data.

Optionally, the first acquisition unit 603 is specifically configured to: create a Huffman tree by using the model based on the plurality of pieces of sequence data, where the model includes a fully connected layer, a plurality of connected layers, and a normalized Softmax classifier; analyze each word in the Huffman tree through the fully connected layer, so as to obtain a plurality of one-hot vectors of a predetermined length; perform gradient iterative processing on the plurality of one-hot vectors of the predetermined length through a plurality of connected layers, so as to obtain column vector data; and process the column vector data by using the Softmax classifier, so as to obtain word embedding vector data.

Optionally, the first acquisition unit 603 is further specifically configured to: set a type by using a HashTable [MaxSize] function; and obtain a keyword of the word embedding vector data and a keyword sequence, and extract record information about searching, deleting and inserting keywords in the hash table by using an address acquisition function, where the address acquisition function is as follows:

$$H_i(\text{key}) = (\text{key} \% p + i) \% m, (1 \le i \le m-1),$$

where key is a keyword, m is a hash table length, i is an incremental sequence of the word embedding vector data, and p is a predetermined prime number; and create a hash table based on the type and the record information, initialize the hash table, insert a keyword sequence into the hash table, and set an average search length of the hash table.

Optionally, the first acquisition unit 603 is specifically further configured to: encode the column vector data into ordered frame sequence information, and set a timer for the ordered frame sequence information, where the timer includes a timer whose timing duration is greater than a round-trip time of the ordered frame sequence information; set an automatic repeat request ARQ protocol and a sliding window protocol, and set a transmission sliding window connected to a connected layer of the Softmax classifier, and set a reception sliding window of the Softmax classifier, where the sliding window protocol includes a transmission rule of the column vector data, and the transmission sliding window includes a sliding window whose window size is a maximum number of transmission frames; and transmit the ordered frame sequence information to the Softmax classifier based on the ARQ protocol, the sliding window protocol, the transmission sliding window, and the reception sliding window, and feed, by using the Softmax classifier, information back to the connected layer that is connected.

Optionally, the sorting unit 611 is specifically configured to: sort the case information in descending order of the values of the target similarity; receive a case output condition input by a user, and determine target case information based on the case output condition, where the case output condition includes at least one of a sorting range and a similarity range; and collect and analyze the target case information, and generate and output a visual graph and text information.

The foregoing has described the knowledge graph-based case retrieval device in the embodiments of the present invention in detail from the perspective of the modular functional entities with reference to FIG. 6 and FIG. 7. The following describes a knowledge graph-based case retrieval equipment in the embodiments of the present invention in detail from the perspective of hardware processing.

FIG. 8 is a schematic structural diagram of a knowledge graph-based case retrieval equipment according to an embodiment of this application. The knowledge graph-based case retrieval equipment 800 may vary widely depending on configuration or performance, and may include one or more central processing units (CPUs) 801 (for example, one or more processors) and memories 809, and one or more storage media 808 (for example, one or more mass storage devices) for storing an application program 807 and data 806. The memory 809 and the storage medium 808 each may be a transient storage or a persistent storage. The program stored in the storage medium 808 may include one or more modules (not shown), and each module may include a series of instruction operations on a knowledge graph-based case retrieval equipment. Still further, the processor 801 may be configured to communicate with the storage medium 808 to perform the series of instruction operations in the storage medium 808 on the knowledge graph-based case retrieval equipment 800.

The knowledge graph-based case retrieval equipment 800 may further include one or more power supplies 802, one or more wired or wireless network interfaces 803, one or more input/output interfaces 804, and/or one or more operating systems 805, such as Windows Server, Mac OS X, Unix, Linux, and FreeBSD. It can be understood by those skilled in the art that the structure of the knowledge graph-based case retrieval equipment shown in FIG. 8 does not constitute a limitation on the knowledge graph-based case retrieval equipment. The processor 801 may perform functions of the first construction unit 601, the sampling unit 602, the first acquisition unit 603, the second construction unit 604, the second acquisition unit 605, the first calculation unit 612, the second calculation unit 613, the third acquisition unit 608, the third calculation unit 609, the fourth calculation unit 610, and the sorting unit 611 in the foregoing embodiments.

The following describes the components of the knowledge graph-based case retrieval equipment in detail with reference to FIG. 8.

The processor 801 is a control center of the knowledge graph-based case retrieval equipment, and can perform processing based on the knowledge graph-based case retrieval method. The processor 801 utilizes various interfaces and lines to connect various parts of the entire knowledge graph-based case retrieval equipment, executes various functions of the knowledge graph-based case retrieval equipment and processes data by running or executing software programs and/or modules stored in the memory 809 and invoking data stored in the memory 809, thereby improving availability of the case retrieval system. Both the storage medium 808 and the memory 809 are carriers for storing data. In the embodiment of this application, the storage medium 808 may refer to an internal memory having a small storage capacity but a high speed, and the memory 809 may refer to an external memory having a large storage capacity but a low storage speed.

The memory 809 may be configured to store software programs and modules, and the processor 801 executes various functional applications and data processing of the knowledge graph-based case retrieval equipment 800 by running the software programs and modules stored in the memory 809. The memory 809 may mainly include a program storage area and a data storage area, where the program storage area may be used to store an operating system, an application program required for at least one function (for example, constructing a legal case knowledge graph by analyzing text information based on a predetermined model, and constructing node set data by analyzing the legal case knowledge graph), and the like; and the data storage area may be used to store data created based on the use (for example, performing random-walk sampling on the node set data by using each node of the node set data as a starting point, so as to obtain a plurality of pieces of sequence data) of a knowledge graph-based case retrieval equipment, and the like. In addition, the memory 809 may include a high speed random access memory, and may further include a non-volatile memory, such as at least one magnetic disk storage device or flash memory device, or another non-volatile solid state storage device. A program of the knowledge graph-based case retrieval method and a received data stream provided in the embodiments of this application are stored in the memory 809, and can be invoked by the processor 801 when necessary.

When the computer program instructions are loaded and executed on a computer, all or some of the processes or functions described in the embodiments of the present application are generated. The computer may be a general-purpose computer, a special-purpose computer, a computer network, or another programmable equipment. The computer instructions may be stored in a computer-readable storage medium, or be transmitted from one computer-readable storage medium to another computer-readable storage medium, where the computer-readable storage medium may be non-volatile or volatile.

What is claimed is:

1. A knowledge graph-based case retrieval method, comprising:
   constructing a legal case knowledge graph by analyzing text information based on a predetermined model, and constructing node set data by analyzing the legal case knowledge graph, wherein the text information comprises historical and/or real-time claim information of a plaintiff, defense information of a defendant, evidence information provided by the plaintiff, evidence information provided by the defendant, and historical legal case information;
   performing random-walk sampling on the node set data by using each node of the node set data as a starting point, so as to obtain a plurality of pieces of sequence data;
   training the model by using a word2vec algorithm based on the plurality of pieces of sequence data, so as to obtain an updated target model;
   obtaining target text information, and analyzing the target text information by using the target model, so as to construct a to-be-retrieved knowledge graph;

retrieving case information and first word embedding vector data associated with the to-be-retrieved knowledge graph from the legal case knowledge graph, and obtaining second word embedding vector data of the to-be-retrieved knowledge graph;

calculating a first similarity and a second similarity of the case information based on the first word embedding vector data and the second word embedding vector data, and adding the first similarity and the second similarity to obtain a target similarity, wherein the first similarity indicates a similarity of the case information in a content description, and the second similarity indicates a similarity of the case information in a logical relationship; and sorting the case information in descending order of values of the target similarity, and outputting the sorted case information;

wherein the performing random-walk sampling on the node set data by using each node of the node set data as a starting point, so as to obtain a plurality of pieces of sequence data comprises:

obtaining a weight of a next node of the starting point by using each node of the node set data as the starting point;

analyzing the weight, so as to set a random walk step number, and analyzing the number of nodes of a branch that the starting point is located, so as to set a random walk step number threshold;

when it is determined that the random walk step number is less than the random walk step number threshold, walking along a node connected to the next node of the starting point based on the random walk step number, generating random walk sequence data, and obtaining the plurality of pieces of sequence data; and when it is determined that the random walk step number is greater than or equal to the random walk step number threshold, walking along a node connected to the next node of the starting point based on the random walk step number threshold, generating random walk sequence data, and obtaining the plurality of pieces of sequence data.

2. The knowledge graph-based case retrieval method according to claim 1, wherein the training the model by using a word2vec algorithm based on the plurality of pieces of sequence data, so as to obtain an updated target model comprises:

creating a Huffman tree by using the model based on the plurality of pieces of sequence data, wherein the model comprises a fully connected layer, a plurality of connected layers, and a normalized Softmax classifier;

analyzing each word in the Huffman tree through the fully connected layer, so as to obtain a plurality of one-hot vectors of a predetermined length;

performing gradient iterative processing on the plurality of one-hot vectors of the predetermined length through the plurality of connected layers, so as to obtain column vector data; and processing the column vector data by using a Softmax classifier, so as to obtain word embedding vector data.

3. The knowledge graph-based case retrieval method according to claim 2, wherein after the performing gradient iterative processing on the plurality of one-hot vectors of the predetermined length through the plurality of connected layers, so as to obtain column vector data, and before the processing the column vector data by using a Softmax classifier, the method further comprises:

encoding the column vector data into ordered frame sequence information, and setting a timer for the ordered frame sequence information, wherein the timer comprises a timer whose timing duration is greater than a round-trip time of the ordered frame sequence information;

setting an automatic repeat request ARQ protocol and a sliding window protocol, and setting a transmission sliding window connected to a connected layer of the Softmax classifier, and setting a reception sliding window of the Softmax classifier, wherein the sliding window protocol comprises a transmission rule of the column vector data, and the transmission sliding window comprises a sliding window whose window size is a maximum number of transmission frames; and transmitting the ordered frame sequence information to the Softmax classifier based on the ARQ protocol, the sliding window protocol, the transmission sliding window, and the reception sliding window, and feeding, by using the Softmax classifier, information back to the connected layer that is connected.

4. The knowledge graph-based case retrieval method according to claim 1, wherein the calculating a first similarity and a second similarity of the case information based on the first word embedding vector data and the second word embedding vector data comprises:

calculating a factual element similarity, a dispute focus similarity, an evidence similarity, a dispute focus association similarity, an evidence association similarity, and a factual element association similarity between the case information and the target text information based on the first word embedding vector data and the second word embedding vector data; and calculating a weighted average of the factual element similarity, the dispute focus similarity, and the evidence similarity based on a first predetermined weight ratio, so as to obtain the first similarity of the case information; and calculating a weighted average of the dispute focus association similarity, the evidence association similarity, and the factual element association similarity based on a second predetermined weight ratio, so as to obtain the second similarity of the case information.

5. The knowledge graph-based case retrieval method according to claim 4, wherein the adding the first similarity and the second similarity to obtain a target similarity comprises:

identifying and obtaining a first similarity that is greater than a first predetermined threshold, and identifying and obtaining a second similarity that is greater than a second predetermined threshold;

calculating a weighted average of the obtained first similarity based on a third predetermined weight ratio, so as to obtain a target first similarity; and calculating a weighted average of the obtained second similarity based on a fourth predetermined weight ratio, so as to obtain a target second similarity; and adding the target first similarity and the target second similarity, so as to obtain the target similarity.

6. The knowledge graph-based case retrieval method according to claim 1, wherein the sorting the case information in descending order of values of the target similarity, and outputting the sorted case information comprises:

sorting the case information in descending order of the values of the target similarity;

receiving a case output condition input by a user, and determining target case information based on the case output condition, wherein the case output condition comprises at least one of a sorting range and a similarity range; and collecting and analyzing the target case information, and generating and outputting a visual graph and text information.

7. A knowledge graph-based case retrieval equipment, comprising a memory, a processor, and a computer program that is stored on the memory and can be run on the processor, wherein the processor implements a knowledge graph-based case retrieval method when executing the computer program, and the method comprises:

constructing a legal case knowledge graph by analyzing text information based on a predetermined model, and constructing node set data by analyzing the legal case knowledge graph, wherein the text information comprises historical and/or real-time claim information of a plaintiff, defense information of a defendant, evidence information provided by the plaintiff, evidence information provided by the defendant, and historical legal case information;

performing random-walk sampling on the node set data by using each node of the node set data as a starting point, so as to obtain a plurality of pieces of sequence data;

training the model by using a word2vec algorithm based on the plurality of pieces of sequence data, so as to obtain an updated target model;

obtaining target text information, and analyzing the target text information by using the target model, so as to construct a to-be-retrieved knowledge graph;

retrieving case information and first word embedding vector data associated with the to-be-retrieved knowledge graph from the legal case knowledge graph, and obtaining second word embedding vector data of the to-be-retrieved knowledge graph;

calculating a first similarity and a second similarity of the case information based on the first word embedding vector data and the second word embedding vector data, and adding the first similarity and the second similarity to obtain a target similarity, wherein the first similarity indicates a similarity of the case information in a content description, and the second similarity indicates a similarity of the case information in a logical relationship; and sorting the case information in descending order of values of the target similarity, and outputting the sorted case information;

wherein the performing random-walk sampling on the node set data by using each node of the node set data as a starting point, so as to obtain a plurality of pieces of sequence data comprises:

obtaining a weight of a next node of the starting point by using each node of the node set data as the starting point;

analyzing the weight, so as to set a random walk step number, and analyzing the number of nodes of a branch that the starting point is located, so as to set a random walk step number threshold;

when it is determined that the random walk step number is less than the random walk step number threshold, walking along a node connected to the next node of the starting point based on the random walk step number, generating random walk sequence data, and obtaining the plurality of pieces of sequence data; and when it is determined that the random walk step number is greater than or equal to the random walk step number threshold, walking along a node connected to the next node of the starting point based on the random walk step number threshold, generating random walk sequence data, and obtaining the plurality of pieces of sequence data.

8. The knowledge graph-based case retrieval equipment according to claim 7, wherein the training the model by using a word2vec algorithm based on the plurality of pieces of sequence data, so as to obtain an updated target model comprises:

creating a Huffman tree by using the model based on the plurality of pieces of sequence data, wherein the model comprises a fully connected layer, a plurality of connected layers, and a normalized Softmax classifier;

analyzing each word in the Huffman tree through the fully connected layer, so as to obtain a plurality of one-hot vectors of a predetermined length;

performing gradient iterative processing on the plurality of one-hot vectors of the predetermined length through the plurality of connected layers, so as to obtain column vector data; and processing the column vector data by using a Softmax classifier, so as to obtain word embedding vector data.

9. The knowledge graph-based case retrieval equipment according to claim 8, wherein after the performing gradient iterative processing on the plurality of one-hot vectors of the predetermined length through the plurality of connected layers, so as to obtain column vector data, and before the processing the column vector data by using a Softmax classifier, the method further comprises:

encoding the column vector data into ordered frame sequence information, and setting a timer for the ordered frame sequence information, wherein the timer comprises a timer whose timing duration is greater than a round-trip time of the ordered frame sequence information;

setting an automatic repeat request ARQ protocol and a sliding window protocol, and setting a transmission sliding window connected to a connected layer of the Softmax classifier, and setting a reception sliding window of the Softmax classifier, wherein the sliding window protocol comprises a transmission rule of the column vector data, and the transmission sliding window comprises a sliding window whose window size is a maximum number of transmission frames; and transmitting the ordered frame sequence information to the Softmax classifier based on the ARQ protocol, the sliding window protocol, the transmission sliding window, and the reception sliding window, and feeding, by using the Softmax classifier, information back to the connected layer that is connected.

10. The knowledge graph-based case retrieval equipment according to claim 7, wherein the calculating a first similarity and a second similarity of the case information based on the first word embedding vector data and the second word embedding vector data comprises:

calculating a factual element similarity, a dispute focus similarity, an evidence similarity, a dispute focus association similarity, an evidence association similarity, and a factual element association similarity between the case information and the target text information based on the first word embedding vector data and the second word embedding vector data; and calculating a weighted average of the factual element similarity, the dispute focus similarity, and the evidence similarity based on a first predetermined weight ratio, so as to obtain the first similarity of the case information; and calculating a weighted average of the dispute focus association similarity, the evidence association similarity, and the factual element association similarity based on a second predetermined weight ratio, so as to obtain the second similarity of the case information.

11. The knowledge graph-based case retrieval equipment according to claim 10, wherein the adding the first similarity and the second similarity to obtain a target similarity comprises:
identifying and obtaining a first similarity that is greater than a first predetermined threshold, and identifying and obtaining a second similarity that is greater than a second predetermined threshold;
calculating a weighted average of the obtained first similarity based on a third predetermined weight ratio, so as to obtain a target first similarity; and calculating a weighted average of the obtained second similarity based on a fourth predetermined weight ratio, so as to obtain a target second similarity; and
adding the target first similarity and the target second similarity, so as to obtain the target similarity.

12. The knowledge graph-based case retrieval equipment according to claim 7, wherein the sorting the case information in descending order of values of the target similarity, and outputting the sorted case information comprises:
sorting the case information in descending order of the values of the target similarity;
receiving a case output condition input by a user, and determining target case information based on the case output condition, wherein the case output condition comprises at least one of a sorting range and a similarity range; and
collecting and analyzing the target case information, and generating and outputting a visual graph and text information.

13. A non-transitory computer-readable storage medium comprising instructions, wherein when the instructions are run on a computer, the computer is enabled to perform a knowledge graph-based case retrieval method, comprising:
constructing a legal case knowledge graph by analyzing text information based on a predetermined model, and constructing node set data by analyzing the legal case knowledge graph, wherein the text information comprises historical and/or real-time claim information of a plaintiff, defense information of a defendant, evidence information provided by the plaintiff, evidence information provided by the defendant, and historical legal case information;
performing random-walk sampling on the node set data by using each node of the node set data as a starting point, so as to obtain a plurality of pieces of sequence data;
training the model by using a word2vec algorithm based on the plurality of pieces of sequence data, so as to obtain an updated target model;
obtaining target text information, and analyzing the target text information by using the target model, so as to construct a to-be-retrieved knowledge graph;
retrieving case information and first word embedding vector data associated with the to-be-retrieved knowledge graph from the legal case knowledge graph, and obtaining second word embedding vector data of the to-be-retrieved knowledge graph;
calculating a first similarity and a second similarity of the case information based on the first word embedding vector data and the second word embedding vector data, and adding the first similarity and the second similarity to obtain a target similarity, wherein the first similarity indicates a similarity of the case information in a content description, and the second similarity indicates a similarity of the case information in a logical relationship; and
sorting the case information in descending order of values of the target similarity, and outputting the sorted case information;
wherein the performing random-walk sampling on the node set data by using each node of the node set data as a starting point, so as to obtain a plurality of pieces of sequence data comprises:
obtaining a weight of a next node of the starting point by using each node of the node set data as the starting point;
analyzing the weight, so as to set a random walk step number, and analyzing the number of nodes of a branch that the starting point is located, so as to set a random walk step number threshold;
when it is determined that the random walk step number is less than the random walk step number threshold, walking along a node connected to the next node of the starting point based on the random walk step number, generating random walk sequence data, and obtaining the plurality of pieces of sequence data; and
when it is determined that the random walk step number is greater than or equal to the random walk step number threshold, walking along a node connected to the next node of the starting point based on the random walk step number threshold, generating random walk sequence data, and obtaining the plurality of pieces of sequence data.

14. The non-transitory computer-readable storage medium according to claim 13, wherein the training the model by using a word2vec algorithm based on the plurality of pieces of sequence data, so as to obtain an updated target model comprises:
creating a Huffman tree by using the model based on the plurality of pieces of sequence data, wherein the model comprises a fully connected layer, a plurality of connected layers, and a normalized Softmax classifier;
analyzing each word in the Huffman tree through the fully connected layer, so as to obtain a plurality of one-hot vectors of a predetermined length;
performing gradient iterative processing on the plurality of one-hot vectors of the predetermined length through the plurality of connected layers, so as to obtain column vector data; and
processing the column vector data by using a Softmax classifier, so as to obtain word embedding vector data.

15. The non-transitory computer-readable storage medium according to claim 14, wherein after the performing gradient iterative processing on the plurality of one-hot vectors of the predetermined length through the plurality of connected layers, so as to obtain column vector data, and before the processing the column vector data by using a Softmax classifier, the method further comprises:
encoding the column vector data into ordered frame sequence information, and setting a timer for the ordered frame sequence information, wherein the timer comprises a timer whose timing duration is greater than a round-trip time of the ordered frame sequence information;
setting an automatic repeat request ARQ protocol and a sliding window protocol, and setting a transmission sliding window connected to a connected layer of the Softmax classifier, and setting a reception sliding window of the Softmax classifier, wherein the sliding window protocol comprises a transmission rule of the column vector data, and the transmission sliding window comprises a sliding window whose window size is a maximum number of transmission frames; and transmitting the ordered frame sequence information to the Softmax classifier based on the ARQ protocol, the sliding window protocol, the transmission sliding window, and the reception sliding window, and feeding, by using the Softmax classifier, information back to the connected layer that is connected.

16. The non-transitory computer-readable storage medium according to claim 13, wherein the calculating a first similarity and a second similarity of the case information based on the first word embedding vector data and the second word embedding vector data comprises:

calculating a factual element similarity, a dispute focus similarity, an evidence similarity, a dispute focus association similarity, an evidence association similarity, and a factual element association similarity between the case information and the target text information based on the first word embedding vector data and the second word embedding vector data; and calculating a weighted average of the factual element similarity, the dispute focus similarity, and the evidence similarity based on a first predetermined weight ratio, so as to obtain the first similarity of the case information; and calculating a weighted average of the dispute focus association similarity, the evidence association similarity, and the factual element association similarity based on a second predetermined weight ratio, so as to obtain the second similarity of the case information.

* * * * *